United States Patent [19]

Nomura

[11] Patent Number: 4,824,444
[45] Date of Patent: Apr. 25, 1989

[54] GAS PERMSELECTIVE COMPOSITE MEMBRANE PREPARED BY PLASMA POLYMERIZATION COATING TECHNIQUES

[75] Inventor: Hiroshi Nomura, Minnetonka, Minn.

[73] Assignee: Applied Membrane Technology, Inc., Minnetonka, Minn.

[21] Appl. No.: 112,994

[22] Filed: Oct. 26, 1987

Related U.S. Application Data

[63] Continuation of Ser. No. 850,954, Apr. 11, 1986, abandoned.

[51] Int. Cl.$^4$ .................................................. B01D 53/22
[52] U.S. Cl. ........................................... 55/16; 55/68; 55/158; 427/41; 428/391
[58] Field of Search ............... 55/16, 68, 158; 427/34, 427/38, 40, 41, 255.1, 255.3, 255.6, 412.3; 428/36, 315.5, 378, 391, 394, 903

[56] References Cited

U.S. PATENT DOCUMENTS

| | | | |
|---|---|---|---|
| 4,031,012 | 6/1977 | Gics | 55/158 X |
| 4,230,463 | 10/1980 | Henis et al. | 55/68 X |
| 4,239,793 | 12/1980 | Matsuura et al. | 55/158 X |
| 4,410,338 | 10/1983 | Yamamoto et al. | 55/158 |
| 4,419,404 | 12/1983 | Arai et al. | 427/41 X |
| 4,470,831 | 9/1984 | Hirose | 428/391 X |
| 4,483,901 | 11/1984 | Okita et al. | 55/158 X |
| 4,493,714 | 1/1985 | Ueda et al. | 55/158 X |
| 4,533,369 | 8/1985 | Okita | 55/158 |
| 4,581,043 | 4/1986 | van der Scheer | 55/158 X |
| 4,594,079 | 6/1986 | Yamamoto et al. | 55/158 |
| 4,599,266 | 7/1986 | Nakayama et al. | 427/41 X |
| 4,601,950 | 7/1986 | Iida et al. | 427/41 X |

FOREIGN PATENT DOCUMENTS

| | | | |
|---|---|---|---|
| 5121 | 1/1981 | Japan | 55/158 |
| 4203 | 1/1982 | Japan | 55/158 |
| 55005 | 4/1983 | Japan | 55/158 |
| 55007 | 4/1983 | Japan | 55/158 |
| 25507 | 2/1985 | Japan | 55/158 |
| 25508 | 2/1985 | Japan | 55/158 |

*Primary Examiner*—Robert Spitzer
*Attorney, Agent, or Firm*—Orrin M. Haugen; Thomas J. Nikolai

[57] ABSTRACT

Gas permselective membranes having a high selectivity and high flux are prepared by plasma polymerizing a coating onto the surface of a microporous membrane substrate. Two types of coatings are disclosed. Gas separatory modules utilize the novel membranes in the form of hollow fibers.

39 Claims, 2 Drawing Sheets

Fig.3

GAS PERMSELECTIVE COMPOSITE MEMBRANE PREPARED BY PLASMA POLYMERIZATION COATING TECHNIQUES

FIELD OF THE INVENTION

This is a continuation of application Ser. No. 850,954, filed Apr. 11, 1986, now abandoned.

This invention relates to gas permselective membranes having $O_2/N_2$ gas permselectivity of greater than 2.3 prepared by depositing a plasma polymerizate coating onto the surface of a microporous membrane substrate. The coating may be prepared from a single specifically selected monomer, or may be copolymerized from two or more specifically selected co-monomers. The body of the substrate retains its original properties of chemical resistance and mechanical strength, while gaining a plasma polymerizate coating which effectively bridges the pores of the substrate, allowing the composite membrane to be used for gas separations with high gas permselectivity and high gas flux. Further, this invention relates to gas separatory modules utilizing the present novel membranes in the form of hollow fibers.

BACKGROUND OF THE INVENTION

In the preparation of conventional gas permselective composite membranes, a variety of problems are often encountered. These include, for example, low gas flux due to the thickness of the coating layer, difficulty in obtaining a thin coating layer, insufficient adhesion strength between the coating layer and the substrate, and difficulty of membrane fabrication. It is particularly difficult to prepare gas permselective composition membranes which achieve both high gas selectivity and high gas flux at the same time. In the case of asymmetric membranes, the problems include complicated fabrication procedures and limited selection of available raw materials.

In the case of composite membranes formed by plasma polymerization coating techniques, the plasma coatings are deposited in networks of highly branched and highly cross-linked segments. The interaction of the plasma polymer coating with the substrate and the unique mechanism of plasma polymer formation result in excellent adhesion of a thin deposit of coating to the substrate. Accordingly, several researchers have investigated applying techniques of plasma polymerization coating to the preparation of gas separatory composite membrane having combined high rates of permselectivity and flux.

European patent Application No. 0 134 055, by Van Der Scheer, discloses a composite dense membrane for selectively separating gases, comprising a dense ultrathin gas selective film of plasma polymerizate, a dense, highly permeable intermediate layer of conventionally-formed polymerizate and a microporous substrate supporting the plasma polymerizate film and the intermediate layer. The conventional polymer deposited directly on the substrate may be an organosiloxane or a copolymer of siloxanes and polycarbonates. The top ultrathin gas selective film is of a silicon-free plasma polymerizate. This reference specifically requires the intermediate layer, and indicates that its presence is necessary to serve two important purposes, that is, (1) to support the plasma polymerizate coating, enabling the deposition of an ultrathin top layer, and (2) to distribute the gas mixture over the microporous substrate, in order to permit the entire composite membrane to be used for gas separation. Thus, Van Der Scheer specifically indicates that high gas selectivity combined with high gas flux would not be expected from depositing a single plasma layer directly onto a microporous substrate. In direct and surprising contrast to the teachings of this patent publication, this invention has been able to prepare a composite membrane of high gas permselectivity and high flux by depositing a "soft" ultrathin plasma polymerizate layer of a specific low molecular weight organosiloxane monomer directly onto a microporous substrate by a novel plasma polymerization procedure. Additionally, this inventor has further unexpectedly discovered that organosiloxanes as a class can provide a highly permselective plasma co-polymerizate layer for direct deposition onto microporous substrates, when a "soft" organosiloxane plasma polymer is co-polymerized with a "hard" plasma polymer. The "hard" plasma polymer is obtained from an organosilane, a fluorocarbon or a hydrocarbon monomer.

In U.S. Pat. No. 4,410,338, Yamamoto, et al., gas separating membranes are disclosed wherein a microporous substrate is plasma coated with a polymer formed from an organic monomer selected from organosilanes, organosiloxanes and olefins. Yamamoto, et al., do not recognize any criticality in the molecular weight or size of the monomer used to prepare the plasma coating. Unexpectedly, the present inventor has discovered that a specific group of low molecular weight organosiloxanes can be used to prepare gas permselective membranes of increased gas selectivity combined with high rates of flux, which are not reported by Yamamoto, et al. Further, the disclosure of Yamamoto, et al., is completely silent on the use of copolymeric plasma coatings, which the present inventor has developed for gas membrane preparation. The gas membranes of Yamamoto, et al., are prepared by positioning a microporous substrate in a conventional radio frequency powered Bell Jar plasma reactor, and depositing a plasma polymerizate coating thereon. The intensity of the plasma glow zone developed in such a conventional plasma reactor is inherently weak, and the intensity decreases with the distance of the substrate from the plasma generating electrode. Thus, the polymerizate coating prepared in such a reactor cannot be intensively cross-linked, due to the weakness of the plasma glow zone intensity, and further, the deposition rate will be very low, and the composition and uniformity of the plasma polymerizate coating will vary with the position of the substrate within the reactor. This inventor has now discovered that gas permselective composite membranes can be prepared with plasma polymerizate coatings of specifically selected monomers and co-monomers, which are of a highly cross-linked structure and of an extremely uniform composition and thickness. This is accomplished by carrying out the plasma polymer deposition in an R. F. tubular plasma reactor with capacitively coupled external electrodes, wherein the plasma glow zone is controlled to the region between the electrodes and is of a higher energy intensity than has been possible with previous conventional plasma reactors.

In previous investigations reported in Thin Solid Films, 118 (1984) pp. 187-195, entitled *Preparation of Gas Separation Membranes by Plasma Polymerization with Fluorocompounds*, this inventor reported other less energy intensive plasma polymerization reactor systems, wherein organic monomers different than those used herein were polymerized to form coatings for gas separatory membranes. However, this inventor has now discovered that certain specific monomers and certain specific combinations of monomers and co-monomers can be used to prepare gas membranes of high selectivity and high rates of flux. Also, this invention has found that the plasma polymerization to prepare them can unexpectedly be carried out in the energy intensive plasma glow zone of a radio frequency powered tubular reactor with capacitively coupled external electrodes.

In the development of the present new gas permselective composite membranes, this inventor needed to overcome problems inherent in the use of previously available plasma polymerization techniques. As applied to the fabrication of composite membranes, conventional plasma polymerization coating methods all suffer from certain inherent disadvantages, regardless of the type of reactor systems utilized (i.e., Bell Jar reactors, A. F. tandem systems, R. F. coil-inductively coupled tubular reactors). These disadvantages, generally, are due to the fact that such conventional plasma polymerization involved deposition of the polyer onto a substrate situated in a low or uneven plasma energy density area. These disadvantages can generally be summarized as follows:

1. Non-uniformity in plasma polymer deposition rates and plasma polymer coating composition, primarily dependant on the substrate's position in the reactor.

2. Low or uncontrollable energy density levels encountered with conventional plasma reactors, whether of the Bell Jar or R. F. coil-inductively coupled tubular type, where polymer deposition takes place in the "after glow" zone, or of the A. F. type, where polymer deposition takes place in the glow zone. Low deposition rates in conventional reactors can further be attributed to the build up of plasma coating on the internal electrodes.

3. Inability to evenly and effectively coat multiple membrane substrates, due to competitive shading from the plasma glow, and due to the fact that polymer deposition rates are primarily dependant on the precise position of the substrate in the reactor.

4. Non-uniformity in coating around the exterior of the membrane substrate, for example, around the circumference of a fiber.

5. Problems in the undesirable formation of multiple chemical species, and the inability to efficiently remove waste chemical species.

6. Difficulty in controlling all of these plasma deposition parameters, particularly in scale-ups to commercial production.

In an effort to overcome these difficulties, this inventor has now developed a process, whereby plasma polymer is deposited on the microporous membrane substrate moving through the energy-intensive glow zone in the region between the external electrodes of an R. F. capacitively coupled tubular reactor. The plasma polymer deposition techniques, as carried out in this reactor system, are highly reliable, able to operate at high production rates and produce a highly desirable uniform product. It is well known in the art that microporous membrane substrates are extremely difficult to plasma coat, particular in continuous commercial productions, due to their sensitivity to manipulative stresses, such as temperature, pressure, tension, and chemical attack. However, this inventor now unexpectedly discloses that microporous membrane substrates can be plasma coated in this manner with speed and efficiency and with uniform desirable results to yield novel gas permselective composite membranes having combined properties of high permselectivity and high flux.

SUMMARY OF THE INVENTION

This invention provides gas permselective microporous composite membranes hving a surface plasma polymerizate coating of specifically selected monomers or a plasma copolymerizate coating of specified combinations of monomers and co-monomers, as further herein described. These gas membranes unexpectedly combine gas selectivity with gas flux in rates much higher than those achievable with previously available plasma coated gas membranes.

This invention also provides a novel plasma polymerization technique for preparing these gas membranes by operating in the intense plasma glow zone of a radio frequency powered tubular reactor with capacitively coupled external electrodes, as further described herein.

It is only by using the specific monomers or by using the specific combination of monomers and co-monomers of this invention, and by carrying out the plasma polymerization in the reactor system as disclosed herein, that the unexpectedly high combination of gas flux and gas selectivity achieved by the present gas membranes can be obtained.

The microporous membrane substrate which provide the basis for the gas perselective microporous composite membranes of this invention can be polyolefins, fluorinated polyolefins, and polysulfones, and can be in the form of films, hollow fibers and the like.

There are two different types of plasma polymerizate coatings which may be used:

(i) The plasma polymerization deposition of a "soft" plasma polymer onto a microporous membrane substrate, where the "soft" plasma polymer is obtained from a specific low molecular weight organosiloxane monomer, as further described herein.

(ii) The plasma deposition of a copolymer of a "soft" plasma polymer and a "hard" plasma polymer, where the "soft" plasma polymer is obtained from an organosiloxane monomer, and the "hard" plasma polymer is obtained from a monomer of an organosilane, a fluorocarbon or a hydrocarbon.

The "soft" plasma polymer covers the micropores of the porous substrate, while the "hard" plasma polymer, copolymerized with the "soft" plasma polymer, adds higher selectivity to the plasma coating for gas separation.

Figure 1:
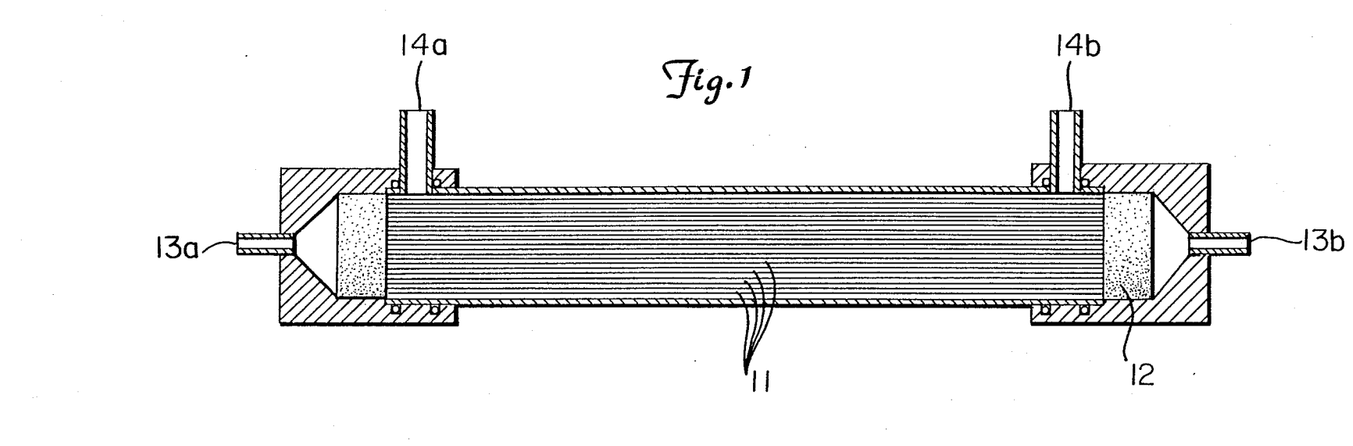
FIG. 1. A separatory module of the both end open type.
Figure 2:
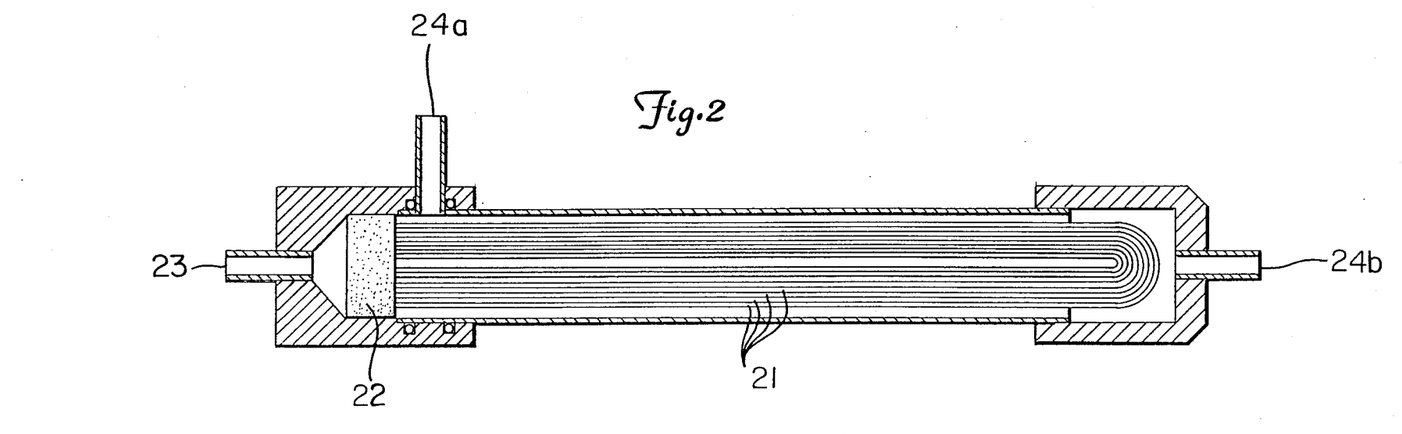
FIG. 2. A separatory module of the one end open type.

Also provided by this invention, the separation of gaseous mixtures can be accomplished by incorporating the present novel gas permselective microporous membranes, in the form of hollow fibers, in a separatory module, suitably according to the type shown in FIGS. 1 and 2.

DETAILED DESCRIPTION OF THE INVENTION

The microporous membranes which may serve as the substrate membranes according to this invention are all well known and readily commercially available. Suitable substrate membranes may be used in the form of flat films, hollow fibers and the like. Hollow fibers are a form presently preferred, because a larger area for gas permeation can be obtained in a specific cubic volume. Therefore, a separatory device, such as the modules according to the present invention, when employing hollow fibers as the separatory membrane, becomes more compact. These microporous substrate membranes may be made of polyolefins, such as polyethylene and polypropylene, fluorinated polyolefins, such as fluorinated ethylene propylene, and polysulfones. The substrate membranes suitable for use in this invention have pore sizes in the range of at least about 10 A to at most about 6000 A. The pores are of various shapes according to the method of fabrication and are generally oval or circular. When the pores are non-circular, the minor axis of the smallest pores are at least about 10 A and the major axis of the largest pores are at most about 6000 A. Suitable membrane substrates that meet these requirements are readily commercially available from Mitsubishi Rayon Co., Ltd., under the proprietary names of KPF 190 M, 270 B and 360 A, and EHF 270 W, 270 T, 270 H, 410 C, 390 C and 390 A, and from Celanese Corp., under the proprietary names of Celgard 2400, 2402, 2500, 2502, 4400, 4410, 4500, 4510, K-442, K-443, X-10 and X-20. Other acceptable polyolefinic and fluorinated polyolefinic films and hollow fibers which may be used are further described in U.S. Pat. Nos. 3,558,764, patented Jan. 26, 1971; 3,679,538, patented July 25, 1972; 3,801,404, patented Apr. 2, 1974; 3,801,692, patented Apr. 2, 1974; 3,839,240, patented Oct. 1, 1974; 3,839,516, patented Oct. 1, 1974; 3,843,761, patented Oct. 22, 1974; 3,920,785, patented Nov. 18, 1975; 4,058,582, patented Nov. 15, 1977; 4,138,549, patented Feb. 6, 1979; 4,255,376, patented Mar. 10, 1981; 4,257,997, patented Mar. 24, 1981; 4,290,987, patented Sept. 11, 1981; and 4,405,688, patented Sept. 20, 1983, all of which are specifically incorporated herein by reference.

The "soft" plasma polymers in the plasma polymerizate coating according to (i) are obtained by using as the monomer precursor lower alkyl substituted disiloxanes of molecular weight of not more than 165 of the Formula I:

wherein, $R_1$, $R_2$, $R_3$, and $R_4$ are individually selected from methyl and ethyl. Examples of such lower alkyl substituted disiloxanes are 1,1,3,3-tetramethyldisiloxane, 1,1,3-trimethyl-3-ethyldisiloxane, 1,1-dimethyl-3,3-diethyldisiloxane, 1,3-dimethyl-1,3-diethyldisiloxane. Presently preferred monomer is 1,1,3,3-tetramethyldisiloxane.

It is not completely understood why this specifically selected class of organosiloxanes form plasma coated microporous substrates of such superior gas separating properties. It is believed that, when all of the available bonds of the disiloxane silicon atoms are attached to carbon: i.e.,

The Si—C bonds tend to weaken the $S_i$—O bonds. Thus, in the energy intensive glow zone, the $S_i$—O bonds are broken easily, releasing the oxygen, which is then no longer available for polymerization. When the remaining moieties polymerize and deposit on the substrate, their properties are more like plasma polymers of silanes: i.e., than plasma polymers of siloxane. The silane monomers simply are unable to form plasma polymers of sufficiently high permselectivities. This problem is not encountered with the less-substituted, lower alkyl disiloxanes of Formula I. This situation has only been recognized by this inventor.

The plasma co-polymerizate coating according to (ii) above is obtained by the co-polymerization of a "soft" plasma polymer and a "hard" plasma polymer. The "soft" plasma polymer is obtained by using as the monomer precursor any organosiloxanes, not limited to those specifically illustrated in Formula I above. In the formation of the co-polymer coating, any organosiloxane may be used, because the organosiloxane then functions only as a "soft" polymer to coat the pores of the substrate and the specific co-monomers add the selectivity that cannot be obtained when using the "soft" monomer alone. The "hard" plasma polymer is obtained by using the monomer precursor organosilanes, fluorocarbons or hydrocarbons. The organosilanes include lower alkyl substituted silanes such as tetramethylsilane, and lower alkoxy substituted silanes, such as tetramethoxysilane, fluorocarbons include perfluorinated hydrocarbons, such as tetrafluoroethylene, and hydrocarbons include low molecular weight hydrocarbons, such as propylene.

The gas membranes which are prepared according to this invention using the lower alkyl substituted disiloxanes as described in formula I above demonstrate much higher rates of gas selectivity and gas flux, than are obtainable with the related gas membranes of Yamamoto, et al., discussed hereinafter. The only disiloxane disclosed by Yamamoto, et al., is a hexamethyldisiloxane a per-alkyl substituted disiloxane which is sterically hindered and more molecularly "bulky" than the siloxanes of Formula I above.

This inventor has now unexpectedly discovered that certain low molecular weight monomers, that is the lower alkyl substituted disiloxanes according to Formula I above, such as 1,1,3,3-tetramethyldisiloxane, when polymerized in the specific plasma polymerization apparatus as described in the present invention, can be rapidly deposited on the microporous membrane substrate to produce a gas permselective composite membrane of inherently superior gas selectivity and gas flux as compared to the gas permselective membranes of Yamamoto, et al., or other conventional pas permselective membranes.

The present plasma polymerization involves activating the required monomer or co-monomer precursors within the glow zone into a high energy, dissociated form enriched with radicals, electrons and ions (i.e., a plasma) and deposited as a plasma polymer or copolymer thereof onto the surface of the substrate moving through the glow zone. In practice, an electric discharge from an R. F. generator is applied to the external electrodes of the capacitively coupled tubular plasma reactor. The selected monomer or co-monomer precursors are introduced into the reactor and energized into a plasma. In this invention, the area of highest plasma energy density within the reactor is controlled to the area between the electrodes and the plasma glow zone.

Since the plasma glow zone is the area of most intense energy density within the reactor, it is imperative that the temperature sensitive substrates used herein have a short residence time in the reactor glow zone, while still allowing for proper deposition of the plasma coating. This is accomplished by moving the substrate in a continuous form such as a film or hollow fiber, through the plasma glow zone where the plasma energized monomer is progressively polymerized and deposited onto this moving substrate.

The movement of the substrate through the region of the plasma glow zone is, of course, regulated by both the pulling speed and by the tension of the substrate. Since the plasma glow zone is the region of highest energy density in the plasma reactor, the pulling speed and the tension must be regulated together in order to allow the substrate to have a residence time in the glow zone sufficient to allow proper deposit of plasma polymer, while avoiding any damage to the substrate from the intensity of the glow zone. At the same time, the pulling speed and the tension must be so regulated together as to avoid allowing the substrate to touch either the walls of the reactor or other substrates, as when a plurality of substrates are being coated simultaneously.

Previous investigators have particularly avoided coating polymeric substrates in the region of the plasma glow zone, because they have experienced uncontrollable degradation of the substrate, and have resorted to coating adjacent to, but outside of, the glow zone. By close control of the specific variables outlines herein, this inentor has unexpectedly been able to obtain accurately controllable and completely reproducible coating to prepare gas permselective microporous composite membranes, retaining the substrate's original properties of mechanical strength and chemical resistance.

Figure 3:
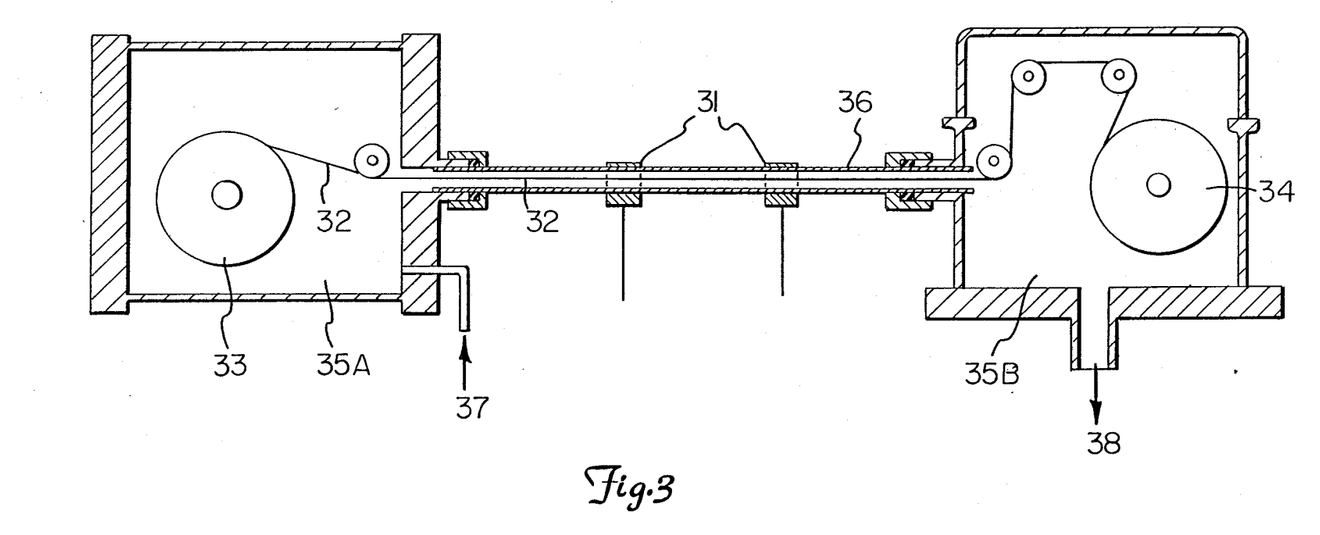
FIG. 3. An outline sectional view of the plasma polymerization system.

A suitable system for the continuous production of the present gas permselective membrane is schematically illustrated in FIG. 3. The R.F. plasma reactor is a tube type reactor 36 with a pair of capacitively coupled external electrodes 31, positioned at either end of the reactor 36, and externally coupled to a radio frequency generator. The highest energy density is maintained in the area between the electrodes, that is, the plasma glow zone by controlling both the current from the R.F. generator and the monomer or co-monomer flow rate. If the flow rate is too fast, the glow zone will "spill over" to the region outside the electrodes. If too slow of a flow rate is used, the plasma will fail to ignite or will fail to fill the entire inter-electrode region. The two chambers 35a and 35b are vacuum chambers connected with the reactor 36 in continuous vacuum-sealed relationship therewith, and 38 is an outlet to a vacuum pump. The reactor 36 may be formed of any material with sufficient resistance to withstand the plasma polymerization reaction condition. Presently, quartz, Pyrex TM and Vycor TM have been found to be satisfactory. In operation, the hollow fiber 32 is continuously traveled through the reactor 36 from the unwind spool 33 to the take-up spool 34. The desired monomer or co-monomer precursors are fed into the system through the feed inlet 37. It is important to minimize the residence time in the plasma glow zone and to keep the substrate as cool as possible (i.e., as close to ambient room temperature) to prevent damage to the temperature sensitive substrate and to encourage rapid deposition rate of the plasma polymer onto the substrate. To achieve the desired thickness of plasma coating and to maximize plasma polymer deposition, the substrate may thus be passed several times through the glow zone. In preparing gas permselective composite membranes, it is important that the pores of the microporous substrate be completely "bridged over", and to achieve this objective it is important that a sufficient plasma polymer or co-polymer coating be deposited. In order to achieve this objective, a system can be provided which reverses the direction of travel of the substrate, allowing a continuous length of substrate to pass through the glow zone several times to achieve the desired coating. The directional flow of the feed can be either with or against the direction of motion of the substrate through the glow zone.

The system, as illustrated in FIG. 3, can readily be adapted to the continuous production of flat film membrane by providing a reactor 36, take-up spools 33 and 34 of sufficient dimensions to accommodate the continuous film. Similarly, multiple fibers are coated simultaneously by providing reactor 36 and unwind and take-up spools 33 and 34 as required.

The energy densities generated in the glow zone of the plasma reactor system according to this invention are much higher than those available with conventional plasma reactors. This requires that the length of exposure to the plasma glow zone be minimized in order to avoid damage to the membrane substrate. For example, a polyolefinic substrate must be moved through the plasma glow zone at a rate normally in excess of about 2 cm/sec for each pass. The residence time within the plasma glow zone will, of course, vary with particular substrates. With a more temperature resistant substrate, such as polysulfone, it is possible to have exposure for a longer period of time in order to achieve the desired plasma polymer coating.

The method of this invention allows for easy deposition of the required plasma polymer coating onto even surfaces, such as films, into circumferential or convoluted surfaces, such as hollow fibers or uneven membrane substrates, and onto a plurality of substrates, for example, films or hollow fibers, moving through the plasma glow zone simultaneously. This is because in the present system, the plasma glow zone is able to be maintained at an even density across the cross-sectional area of the tubular reactor. In conventional plasma reactors which allow for plasma depositions within the glow zone (e.g., A.F. tandem systems), the glow zone cannot be maintained at an even density. Also, internally positioned electrodes, of either conventional A.F. or R.F. reactor systems, eventually become coated with plasma polymer over time, further diminishing the energy intensity of the glow zone. In plasma reactors where deposition takes place in the "after glow" zone, (e.g., Bell Jar and R.F. coil-inductively coupled tubular reactors), the density of the plasma, and thus the density of the deposited polymer, decreases with distance from the glow and gas flow patterns become uncontrollable. Also, in conventional plasma polymerization reactors, the substrate must be positioned, for example, on the electrode or on the wall of the reactor. With such conventional systems, the quality and uniformity of the coating is known to vary according to the position of the substrate relative to the plasma glow. Thus, when multiple substrates are plasma polymer coated simultaneously, the composition and uniformity of the plasma polymer coating will vary dependent on the individual substrate's position relative to the plasma glow zone. Also, in order to replicate a particular plasma polymer coating onto a particular substrate, the substrate must be carfully positioned in the exact same position within the reactor. These problems are all inherent in the operation of the system illustrated, for example, in U.S. Pat. No. 4,410,338, by Yamamoto, et al. In the present system, by contrast, quality and uniformity of the product within each run and between runs is assured due to the even density throughout the glow zone.

Tension on the substrate moving through the plasma glow zone must be kept as low as possible, to maintain the original shape and tensile strength of the substrate membrane, while allowing for proper spacing between multiple substrates and preventing the substrate from touching the wall of the reactor. Due to plasma glow zone intensity in the present system, the rate of plasma polymer deposition is much higher than possible with conventional plasma reactor systems. Plasma polymer deposition is controlled between the electrodes and "after glow" deposition is kept to a minimum.

Proper spacing between the electrodes depends on the size of the tube. In the system described here, the electrodes are approximately 10-15 cm apart and the tube has a diameter of 13 mm. With larger diameter tubes, the energy density associated with the plasma glow zone should be maintained as close as possible to that in the smaller tubular reactor. Along with energy density, it is extremely important to control the monomer density. Although monomer density will generally remain the same with changes in tube size, some variation in the optimum of both energy density and monomer density will result with changes in system size and design.

Due to the extremely high energy density within the plasma glow zone, the temperature of the substrate as it moves through the plasma glow zone must be kept as low as possible (close to ambient room temperature) to ensure even plasma polymer deposition rate and prevent distortion and damage to the substrate. Under normal process conditions, some deposition of plasma polymer on the wall of the reactor is normally observed. This does not deleteriously affect the process conditions and this is normally to be expected and is removed by routine maintenance. By keeping the substrate as cool as possible, plasma polymer will be encouraged to deposit out on the membrane substrate in preference to the walls of the reactor. Additional cooling of the substrate below room temperature may be used, if desired, with the expectation that residence time in the reactor may be increased and that plasma polymer will be further encouraged to deposit out on the membrane substrate.

A useful guide in determining changes in reaction parameters with changes in tubular geometry is the composite discharge parameter, W/FM, where W is the plasma wattage, F is the flow rate of the monomer or monomers, and M is the molecular weight of the monomer or monomers. As the tubular geometry and system size varies, W/FM may vary for a given plasma polymer or copolymer deposition rate, but optimum W/FM will vary between one-half to twice that of the original W/FM for a given monomer system. Therefore, for a given monomer system, changes in the composition plasma parameter with changes in tubular geometry may be expressed:

$$(\tfrac{1}{2}) W_a/F_aM_a < W_b/F_bM_b < (2) W_a/F_aM_a$$

where
 $W_b/F_bM_b$ is the composite plasma parameter for a first tubular R.F. tubular reactor as described herein, and
 $W_a/F_aM_a$ is the composite plasma parameter for a differently sized tubular R.F. reactor as described herein.

The advantages of the present plasma polymerization system over conventional plasma polymerization systems include:

1. The ability to coat both individual and plural substrates with uniformity throughout in thickness and chemical composition of the plasma polymer.

2. The ability to combine high energy densities and high deposition rates with minimum residence time for the substrate in the energy intensive plasma glow zone.

3. The ability to generate a narrower population of chemical species within the plasma glow zone than is possible in conventional plasma reactors, as evidenced by the uniform properties of the plasma polymer coatings obtained.

4. The ability to remove waste products (i.e., unreacted monomers and potentially damaging etchant gases) from the glow zone of the tubular reactor in a continuous manner, minimizing the effect of their presence. This is due to the fact that the monomer flow rate is faster than the speed of the substrate, allowing these waste products to be swept away. Furthermore, since the plasma polymer is almost exclusively deposited in the plasma glow zone, when the substrate moves in the "after glow" zone of the reactor, it is already protected by the deposited plasma polymer layer, which prevents any possible damage from these waste products. With the system of reverse-direction motion to allow for repeatedly passing a continuous length of substrate through the glow zone, the speed of the monomer gas flow prevents "after glow" zone waste products from damaging any portion of the substrate as yet uncoated.

5. Additional advantages include the ability to manufacture composite membranes in the continuous process at rates acceptable for commercial scale production and the ability to plasma coat such sensitive substrates as polyolefins, which under conventional plasma reactor condition, are not considered preferred membrane substrates. As mentioned above, an additional advantage is the ability to plasma coat using the specific low molecular weight monomers described herein, which are not preferred reactants for conventional plasma polymerization systems due to their low deposition rates in such systems.

FIG. 1 shows a schematic outline of a separatory module of the both end open type employing gas permselective microporous composite membrane of this invention, in the form of hollow fibers. A plurality of hollow fibers 11 is preferably used in each module unit, which may be formed of glass or any acceptable inert material. The ends of the hollow fibers are secured within each end cap 12 of the module unit so that a gaseous mixture, flowing into the inlet 14a of the module unit will flow around the hollow fibers 11. The impermeate gas will exit through the outlets 13a and 13b and the impermeate gas will exit through the outlet 14b. Alternatively, a gaseous mixture may flow into the inlet 13a of the module unit flowing through the interior of the hollow fibers 11. The permeate gas will exit through outlets 14a and 14b and the impermeate gas will exit through the outlet 13b.

FIG. 2 shows a schematic outline of a separatory module of the one end open type employing the hollow fibers of the gas permselective microporous composite membrane of this invention. A plurality of hollow fibers 21 is preferably used in each module unit. The hollow fibers are inserted into the module shell, which may be formed of glass or any acceptable inert material. The ends of the hollow fibers are secured within the end cap 22 of the module unit so that a gaseous mixture, flowing into the inlet 24a of the module will flow around the hollow fibers 21. The permeate gas will exit through outlet 23 and the impermeate gas will exit through the outlet 24b. Other suitable separatory modules according to this invention incorporating the present gas permselective hollow fiber membranes are more completely described in U.S. Pat. Nos. 3,821,087, patented June 28, 1974; 3,883,393, patented May 13, 1975; and 4,184,922, patented Jan. 22, 1980, all by Knazek, et al., all of which are specifically incorporated herein by reference.

As will be obvious to those skilled in the art, the manner in which the gas permselective microporous composite membranes of this invention are employed in gas separation procedures is merely a matter of choice and expediency. It need not be limited to the specific apparatus illustrated herein, but may be used in any manner which will effect the required gas separation.

The flux $J(cm^3/cm^2 \, sec)$ through a membrane is generally expressed as $$J = P(\Delta p/l)$$

where $P(cm^3 \, cm/cm^2 \, sec \, cmHg)$ is the permeability coefficient and by $p(cmHg)$ is the pressure difference across a membrane of thickness $l$ (cm). For a composite membrane, the permeability $P/l$ is suitable to express the permeability of gases since the permeability coefficients of the plasma coating layer and that of the substrate cannot be determined separately. In the case of a hollow fiber, the membrane area is properly calculated using the logarithmic mean of the inside and outside diameters.

The permselectivity $[P(A)/P(B)]^*$ is also an important factor in evaluating membrane selectivity for the binary gaseous system A-B. The permselectivity $[P(A)/P(B)]^*$ is obtained by the following equation:

$$[P(A)/P(B)]^* = \frac{C_{A2}(p_1 C_{B1} - p_2 C_{B2})}{C_{B2}(p_1 C_{A1} - p_2 C_{A2})}$$

where $C_{A1}$ and $C_{B1}$ are mole fractions in the feed and $C_{A2}$ and $C_{B2}$ are those in the permeate for gaseous components A and B respectively, and $P_1$ and $P_2$ are absolute pressures in the feed and the permeate, respectively. In the ideal case, for instance, with no interaction between gases, no pressure drop in the bore of the hollow fiber, the value of the permselectivity $[P(A)/P(B)]^*$ is the ratio of permeability coefficients, $P(A)/P(B)$.

The gas permselective membranes of this invention which have high selectivity for the gaseous system, oxygen-nitrogen, are useful for oxygen enrichment applications and for purification and separation of nitrogen from air. Present membranes which show high selectivity for the gaseous system hydrogen-carbon monoxide, are useful in the preparation of synthetic fuels from water gas. Membranes which show high selectivity for the nitrogen-hydrogen system are useful in ammonia synthesis. Membranes with high selectivity for the system helium-methane are useful for the practical recovery of helium from natural gas sources. Membranes demonstrating selectivity for the system carbon dioxide-methane are useful for the methane purification of biogas, primarily by carbon dioxide removal.

In the following specific examples, measurements of membrane performances were carried out at room temperature. The applied gauge pressure was 6.5 atm. The gas which permeated the membrane was withdrawn at atmospheric pressure. Compressed air was used for the feed, and the concentration ratio, $O_2/N_2$, was approximately 21/79. The concentrations of components were determined by means of gas chromatography (Detector: TCD, Column: molecular sieve 5A, Shimadzu Co., Japan).

PREPARATION

Polypropylene microporous hollow fiber which has an inner diameter of 100 micrometer, 20% porosity, and 24.5 micrometer wall thickness, was used as the substrate. Plasma polymerization coating was carried out according to the following conditions:

(i)

Monomer: 1,1,3,3-tetramethyldisiloxane
Discharge Power: 5 watts, R. F. generator (13.56 MHz)
Pulling speed: 2.4 cm/sec
Monomer flow rate: varied (ii)

Monomer: 1,1,3,3-tetramethyldisiloxane +
  (a) tetramethoxysilane
  (b) tetramethylsilane
  (c) tetrafluoroethylene
  (d) propylene
Discharge Power: 5 watts, R. F. generator (13.56 MHz)
Pulling speed: 2.4 cm/sec where pulling speed determines fiber residence time in the plasma glow. With a typical electrode distance of 15 cm, the plasma coating was applied by passing the substrate three times through the plasma glow region. Therefore, the total residence distance was 45 cm, and residence time in plasma glow was 19 sec.

In the preparation of the plasma copolymer coating according to preparation (ii), following the plasma copolymer deposition, the membranes were cured by immersion in anhydrous ethanol for one hour. This curing procedure functions to tighten the cross-linked crystalline structure of the plasma copolymer and improves the gas selectivity of the composite membrane.

EXAMPLE 1

Microporous hollow fiber was coated by plasma polymerization according to condition (i) in the preparation section. Monomer flow rates and system pressures were as follows:

Membrane 484-11: Monomer flow rate; 5.12 SCCM, System pressure: P(inlet) 145.3 mtorr; P(outlet); 81.4 mtorr, Membrane 484-22: Monomer flow rate; 3.64 SCCM, System pressure: P(inlet) 117.8 mtorr, P(outlet); 55.0 mtorr, Membrane 484-32: Monomer flow rate; 6.66 SCCM, System pressure: P(inlet); 173.5 mtorr, P(outlet); 100.5 mtorr, Membrane 497-11: Monomer flow rate 5.80 SCCM, P(inlet); 160.0 mtorr, P(outlet) 83.2 mtorr, Membrane 500-12: Monomer flow rate; 5.80 SCCM, P(inlet), 157.9 mtorr, P(outlet) 97.2 mtorr.

Membrane performances for above membranes are shown in Table I. Oxygen concentration in permeate varied between 37.7%–41.2% (Permselectivity $[P(O_2)/P(N_2)]$*: 2.6–3.2) due to coating conditions, while permeability (P/l) varied between $7.48 \times 10^{-5}$ to $1.41 \times 10^{-5}$ cm$^3$/cm$^2$ sec cmHg.

TABLE I
MEMBRANE PERFORMANCES

| Membrane No. | Oxygen Concentration in Permeate (%) | Permeability P/l, (cm$^3$/cm$^2$ sec cmHg) | Permselectivity $[P(O_2)/P(N_2)]$ |
|---|---|---|---|
| 484-11 | 39.1 | $4.90 \times 10^{-5}$ | 2.9 |
| 484-22 | 41.2 | 1.41 | 3.2 |
| 484-32 | 37.7 | 7.48 | 2.6 |
| 497-11 | 39.1 | 2.98 | 2.9 |
| 500-12 | 38.2* | 5.12* | 2.8 |

Feed; $O_2/N_2$ = 21.6/78.4
Feed* = 21.3/78.7

EXAMPLE 2

Microporous hollow fiber was coated by plasma polymerization according to condition (ii) in the preparation section. Monomer flow rates and system pressures are as follows:

Membrane 504-212: Monomer flow rate; 3.76 SCCM (1,1,3,3, tetramethyldisiloxane/tetramethoxysilane=50/50), System pressure: P(inlet) 118.5 mtorr, P(outlet) 71.5 mtorr, Membrane 503-212: Monomer flow rate; 4.10 SCCM (1,1,3,3, tetramethyldisiloxane/tetramethylsilane=50/50), System pressure: P(inlet) 128.0 mtorr, P(outlet) 80.2 mtorr, Membrane 513-122: monomer flow rate; 4.20 SCCM (1,1,3,3, tetramethyldisiloxane)30 2.45 SCCM (tetrafluoroethylene), System pressure; P(inlet) 132.2 mtorr, P(outlet) 77.2 mtorr, Membrane 505-212: Monomer flow rate; 4.60 SCCM (1,1,3,3, tetramethyldisiloxane)+1.16 SCCM (propylene), System pressure: P(inlet) 114.2 mtorr, P(outlet) 65.9 mtorr.

After plasma coating, membranes were cured by immersing in anhydrous ethanol for 1 hour.

Membrane performances for above membranes are shown in Table II. Oxygen concentration in permeate varied between 39.5% to 42.1% (Permselectivity. $[P(O_2)P(N_2)]$*; 3.0 to 3.4), while permeability (P/l) varied between $5.78 \times 10^{-5}$ to $2.02 \times 10^{-5}$ cm$^3$/cm$^2$ sec cmHg.

TABLE II
MEMBRANE PERFORMANCES

| Membrane No. | Oxygen Concentration in Permeate (%) | Permeability P/l, (cm$^3$/cm$^2$ sec cmHg) | Permselectivity $[P(O_2)/P(N_2)]$* |
|---|---|---|---|
| (a) TMDSO + TMOS 504-212 | 39.5 | $5.78 \times 10^{-5}$ | 3.0 |
| (b) TMDSO + TMS 503-212 | 39.7 | 3.15 | 3.0 |
| (c) TMDSO + TFE 513-122 | 40.0 | 3.64 | 3.1 |
| (d) TMDSO + PP 505-212 | 42.1 | 2.06 | 3.4 |

Feed; $O_2/N_2$ = 21.3/78.7
TMDSO; 1,1,3,3, Tetramethyldisiloxane,
TMOS; Tetramethoxysilane,
TMS; Tetramethysilane,
TFE; Tetrafluoroethylene,
PP; Propylene

What is claimed is:

1. A method for separating gases comprising:
   positioning a gas permselective hollow fiber membrane having an $O_2/N_2$ gas permselectivity of at least about 2.3 in a suitable gas separatory apparatus,
   wherein said membrane comprises a microporous hollow fiber substrate, and a gas permselective plasma polymerizate coating on the surface of the substrate, wherein the plasma polymerizate coating is formed from a lower alkyl substituted disiloxane monomer of molecular weight of not more than 165 according to the formula:

wherein $R_1$, $R_2$, $R_3$ and $R_4$ are individually selected from methyl and ethyl, and
   contacting a gaseous mixture with said membrane in order to effect the required separation.

2. A method for separating gases comprising:
   positioning a gas permselective hollow fiber membrane having an $O_2/N_2$ gas permselectivity of at least about 2.3 in a suitable gas separatory apparatus,
   wherein said membrane comprises a microporous hollow fiber substrate, and a gas permselective plasma polymerizate coating on the surface of the substrate, wherein the plasma polymerizate coating is formed from the co-polymerization of a disiloxane monomer, and a co-monomer selected from organo silanes, fluorocarbons and hydrocarbons,
   and contacting a gaseous mixture with said membrane in order to effect the required separation.

3. A gas permselective hollow fiber membrane having an $O_2/N_2$ gas permselectivity of greater than 2.3 comprising:
   a microporous hollow fiber substrate; and
   a gas permselective plasma polymerizate coating on the surface of the substrate, wherein the plasma polymerizate coating is formed from a lower alkyl substituted disiloxane monomer of molecular weight of not more than 165 according to the formula:

wherein $R_1$, $R_2$, $R_3$, and $R_4$ are individually selected from methyl and ethyl.

4. A gas permselective hollow fiber membrane according to claim 3, wherein the microporous substrate is selected from polyolefins, fluorinated polyolefins or polysulfones having pore sizes in the range of at least about 10 A to at most about 6000 A.

5. A gas permselective hollow fiber membrane according to claim 4, wherein the microporous substrate is polypropylene, polyethylene, fluorinated ethylene propylene or polysulfone.

6. A gas permselective hollow fiber membrane according to claim 5, wherein the lower alkyl substituted disiloxane monomer is 1,1,3,3-tetramethyldisiloxane.

7. A gas permselective hollow fiber membrane according to claim 3, wherein the lower alkyl substituted disiloxane monomer is selected from 1,1,3,3-tetraamethyldisiloxane, 1,1,3-trimethyl-3-ethyldisiloxane, 1,1-dimethyl-3,3-diethyldisiloxane and 1,3-dimethyl-1,3-diethyldisiloxane.

8. A gas permselective hollow fiber membrane having an $O_2N_2$ gas permselectivity of greater than 2.3 comprising:
a microporous hollow fiber substrate; and
a gas permselective plasma polymerizate coating on the surface of the substrate;
wherein the plamsa polymerizate coating is formed from the copolymerization of
a disiloxane monomer, and
a co-monomer selected from organo silanes, fluorocarbons and hydrocarbons.

9. A gas permselective hollow fiber membrane according to claim 8, wherein the disiloxane monomer is selected from 1,1,3,3-tetramethyldisiloxane, 1,1,3-trimethyl-3-ethyldisiloxane, 1,1-dimethyl-3,3-diethyldisiloxane and 1,3-dimethyl-1,3-diethyldisiloxane and the co-monomer is selected from a lower alkyl silane, a lower alkoxy silane, a perfluorinated low molecular weight hydrocarbon and a low molecular weight hydrocarbon.

10. A gas permselective hollow fiber membrane according to claim 9, wherein the disiloxane is 1,1,3,3-tetramethyldisiloxane, and the co-monomer is selected from tetramethoxysilane, tetramethylsilane, tetrafluoroethylene and propylene.

11. A gas permselective hollow fiber membrane according to claim 8, wherein the microporous substrate is selected from polyolefins, fluorinated polyolefins and polysulfones having pore sizes in the range of at least about 10 A to at most about 6000 A.

12. A gas permselective hollow fiber membrane according to claim 11, wherein the microporous substrate is polypropylene, polyethylene, fluorinated ethylene propylene or polysulfone.

13. A module for separating gaseous mixtures comprising:

a shell means having spaced end portions and defining an elongated chamber therebetween,
a plurality of individual gas permselective hollow fiber membranes having an $O_2/N_2$ gas permselectivity of greater than 2.3,
said membranes comprising a microporous hollow fiber substrate, and a gas permselective plasma polymerizate coating on the surface of the substrate, wherein the plasma polymerizate coating is formed from a lower alkyl substituted disiloxane monomer of molecular weight of not more than 165 according to the formula:

wherein $R_1$, $R_2$, $R_3$ and 4 are individually selected from methyl and ethyl,
wherein said membranes are exending in substantially parallel relationship spaced from each other within said shell means, said chamber being divided by the walls of said hollow fibers into an intracapillary space within said hollow fiber and an extracapillary space outside said hollow fibers, said intracapillary space and said extracapillary space communicating with each other only through the walls of said hollow fibers,
means communicating with said extracapillary space for passing gaseous mixtures therethrough, and
means communicating with said intracapillary space for removing permeate gas therefrom.

14. A module according to claim 13, wherein the hollow fiber substrate is selected from polyolefins, fluorinated polyolefins and polysulfones having pore sizes in the range of at least about 10 A to at most about 6000 A.

15. A module according to claim 14, wherein the hollow fiber substrate is polypropylene, polyethylene, fluorinated ethylene propylene or polysulfone.

16. A module according to claim 13, wherein the plasma polymerizate coating on the surface of the hollow fiber is selected from 1,1,3,3-tetramethyldisiloxane, 1,1,3-trimethyl-3-ethyldisiloxane, 1,1-dimethyl-3,3-diethyldisiloxane and 1,3-dimethyl-1,3-diethyldisiloxane.

17. A module according to claim 16, wherein the monomer is 1,1,3,3-tetramethyldisiloxane.

18. A module for separating gaseous mixtures comprising:
a shell means having spaced end portions and defining an elongated chamber therebetween,
a plurality of gas permselective hollow fiber membranes having $O_2/N_2$ gas permselectivity of greater than 2.3,
said membranes comprising a microporous hollow fiber substrate, and a gas permselective plasma polymerizate coating on the surface of the substrate, wherein the plasma polymerizate coating is formed from the co-polymerization of a disiloxane monomer, and a co-monomer selected from organo silanes, fluorocarbons and hydrocarbons,
wherein said membranes are extending in substantially parallel relationship spaced from each other within said shell means, said chamber being divided by the walls of said hollow fibers into an intracapillary space within said hollow fibers and an extracapillary space outside said hollow fibers, said intracapillary space and said extracapillary space communicating with each other only through the walls of said hollow fibers, means communicating with said extracapillary space for passing gaseous mixtures therethrough, and means communicating with said intracapillary space for removing gaseous permeate therefrom.

19. A module according to claim 18, wherein the plasma polymerizate coating on the surface of the hollow fiber is formed from the co-polymerization of an organo siloxane monomer, co-polymerized with a co-monomer selected from organo silanes, fluorocarbons and hydrocarbons.

20. A module according to claim 19, wherein the monomer is 1,1,3,3-tetramethyldisiloxane and the co-monomer is tetramethoxysilane, tetramethylsilane, tetrafluoroethylene or propylene.

21. A gas permselective hollow fiber membrane having an $O_2/N_2$ gas permselectivity of greater than 2.3 comprising:

a gas permselective plasma polymerizate coating on the surface of the substrate;

wherein the plasma polymerizate coating is formed from a lower alkyl substituted disiloxane monomer of molecular weight of not more than 165 according to the formula:

wherein $R_1$, $R_2$, $R_3$ and $R_4$ are individually selected from methyl and ethyl;

said gas permselective hollow fiber membrane prepared by a method comprising:

moving said microporous substrate through a tubular plasma reactor;

wherein the tubular plasma reactor has capacitively coupled external electrodes and a plasma glow zone controlled between the electrodes of the reactor;

applying a radio frequency discharge to the electrodes of the reactor;

introducing said lower alkyl substituted disiloxane monomer into the reactor in order to energize the monomer into a plasma controlled within the glow zone between the electrodes of the reactor; and depositing a gas permselective plasma polymerizate coating onto the surface of the microporous substrate moving through the glow zone.

22. A gas permselective hollow fiber membrane according to claim 21, wherein the microporous substrate is selected from polyolefins, fluorinated polyolefins or polysulfones having pore sizes in the range of at least about 10 A to at most about 6000 A.

23. A gas permselective hollow fiber membrane according to claim 22, wherein the microporous substrate is polypropylene, polyethylene, fluorinated ethylene propylene or polysulfone.

24. A gas permselective hollow fiber membrane according to claim 23, wherein the lower alkyl substituted disiloxane monomer is 1,1,3,3-tetramethyldisiloxane.

25. A gas permselective hollow fiber membrane according to claim 21, wherein the lower alkyl substituted disiloxane monomer is selected from 1,1,3,3-tetramethyldisiloxane, 1,1,3-trimethyl-3-ethyldisiloxane, 1,1-dimethyl-3,3-diethyldisiloxane and 1,3-dimethyl-1,3-diethyldisiloxane.

26. A gas permselective hollow fiber membrane having an $O_2/N_2$ gas permselectivity of greater than 2.3 comprising:

a microporous hollow fiber substrate; and a gas permselective plasma polymerizate coating on the surface of the substrate;

wherein the plasma polymerizate coating is formed from the copolymerization of:

a disiloxane monomer; and a co-monomer selected from organo silanes, fluorocarbons and hydrocarbons;

said gas permselective hollow fiber membrane prepared by a method comprising:

moving said microporous substrate through a tubular plasma reactor;

wherein the tubular plasma reactor has capacitively coupled external electrodes and a plasma glow zone controlled between the electrodes of the reactor;

applying a ratio frequency discharge to the electrodes of the reactor;

introducing said disiloxane monomer co-polymerized with said co-monomer into the reactor in order to energize the monomer and co-monomer into a plasma controlled within the glow zone between the electrodes of the reactor; and depositing a gas permselective plasma polymerizate coating onto the surface of the microporous substrate moving through the glow zone.

27. A gas permselective hollow fiber membrane according to claim 26, wherein the disiloxane monomer is selected from 1,1,3,3-tetramethyldisiloxane, 1,1,3-trimethyl-3-ethyldisiloxane, 1,1-dimethyl-3,3-diethyldisiloxane and 1,3-dimethyl-1,3-diethyldisiloxane and the co-monomer is selected from a lower alkyl silane, a lower alkoxy silane, a perfluorinated low molecular weight hydrocarbon and a low molecular weight hydrocarbon.

28. A gas permselective hollow fiber membrane according to claim 26, wherein the disiloxane is 1,1,3,3-tetramethyldisiloxane, and the co-monomer is selected from tetramethoxysilane, tetramethylsilane, tetrafluoroethylene and propylene.

29. A gas permselective hollow fiber membrane according to claim 26, wherein the microporous substrate is selected from polyolefines, fluorinated polyolefins and polysulfones having pore sizes in the range of at least about 10 A to at most about 6000 A.

30. A gas permselective hollow fiber membrane according to claim 29, wherein the microporous substrate is polypropylene, polyethylene, fluroinated ethylene propylene or polysulfone.

31. A method of making a gas permselective composite membrane, comprising:

moving a microporous substrate through a tubular plasma reactor, wherein the tubular plasma reactor has capacitively coupled external electrodes and a plasma glow zone controlled between the electrodes of the reactor, applying a radio frequency discharge to the electrodes of the reactor, introducing an organo siloxane monomer, co-polymerized with a co-monomer selected from an organo siloxane, a fluorocarbon and a hydrocarbon into the reactor in order to energize the monomer and co-monomers into a plasma controlled within the glow zone between the electrodes of the reactor, and depositing a gas permselective plasma polymerizate coating onto the surface of a microporous substrate moving through the glow zone.

32. A method according to claim 31, wherein the microporous substrate is selected from films and hollow fibers having pore sizes in the range of at least about 10 A to at most about 6000 A.

33. A method according to claim 32, wherein the microporous substrate is a hollow fiber.

34. A method according to claim 31, wherein the reactor is adapted to process the microporous substrate in the form of a continuous film or hollow fiber.

35. A method according to claim 31, wherein the microporous substrate is polypropylene, polyethylene, fluorinated ethylene propylene or polysulfone.

36. A method according to claim 35, wherein the plasma polymerizate coationg is formed from an organo siloxane.

37. A method according to claim 36, wherein the plasma polymerizate coating is formed from 1,1,3,3-tetramethyldisiloxane.

38. A method according to claim 31, wherein the plasma polymerizate is formed from an organo siloxane, co-polymerized with an organo silane, a fluorocarbon or a hydrocarbon.

39. A method according to claim 38, wherein the plasma polymerizate is formed from 1,1,3,3-tetramethyldisiloxane co-polymerized with tetramethoxysilane, tetramethylsilane, tetrafluoroethylene or propylene.

* * * * *

UNITED STATES PATENT AND TRADEMARK OFFICE
CERTIFICATE OF CORRECTION

PATENT NO. : 4,824,444
DATED : April 25, 1989
INVENTOR(S) : Hiroshi Nomura

It is certified that error appears in the above-identified patent and that said Letters Patent is hereby corrected as shown below:

Column 15, line 38, "plamsa" should read -- plasma --.

Column 18, line 22, "ratio" should read -- radio --.
Line 49, "polyolefines" should read -- polyolefins --.

Signed and Sealed this

Third Day of October, 1989

Attest:

DONALD J. QUIGG

Attesting Officer

Commissioner of Patents and Trademarks